(No Model.)

G. RUPLEY.
LUBRICATOR.

No. 369,128. Patented Aug. 30, 1887.

WITNESSES:
D. C. Reusch.
C. Sedgwick

INVENTOR:
G. Rupley
BY Munn & Co.
ATTORNEYS.

N. PETERS, Photo-Lithographer, Washington, D. C.

UNITED STATES PATENT OFFICE.

GEORGE RUPLEY, OF DULUTH, MINNESOTA.

LUBRICATOR.

SPECIFICATION forming part of Letters Patent No. 369,128, dated August 30, 1887.

Application filed June 14, 1887. Serial No. 241,293. (No model.)

*To all whom it may concern:*

Be it known that I, GEORGE RUPLEY, of Duluth, in the county of St. Louis and State of Minnesota, have invented a new and Improved Lubricator, of which the following is a full, clear, and exact description.

This invention relates to a novel form of lubricator which is applicable for use in connection with fixed bearings of revoluble shafts.

Reference is to be had to the accompanying drawings, forming a part of this specification, in which similar figures of reference indicate corresponding parts in all the views.

Figure 2:
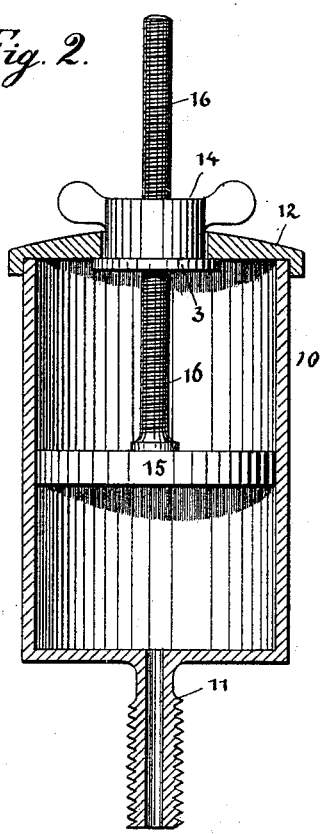
Figure 1:
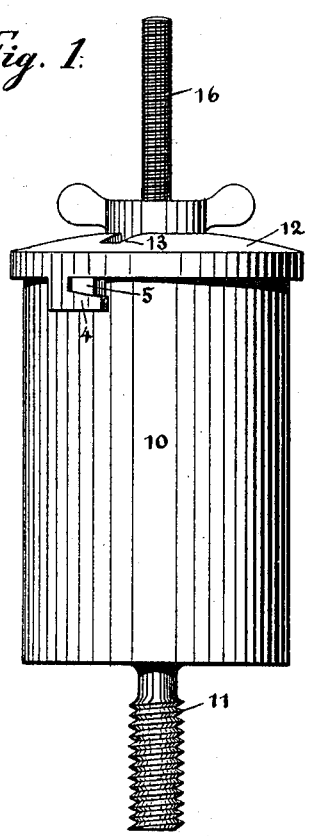
Figure 3:
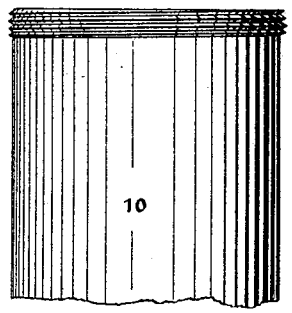

Figure 1 is a side view of my improved form of lubricator. Fig. 2 is a central sectional view of the same. Fig. 3 is a view of a modified construction, and Fig. 4 is an inverted plan view of the lubricator-cover.

In the drawings above referred to, 10 represents a cup adapted to receive the lubricating material, which is preferably in a semisolid state, and this cup is provided with a downwardly-extending centrally-apertured and exteriorly-threaded projection, 11, which is arranged for connection with the bearing that is to be supplied with the lubricating material contained within the cup 10. The cup 10 is closed by a cover, 12, which is formed with a central opening, 13, and with side lugs or projections, 4, that are arranged to engage projections 5, that are formed upon the peripheral face of the cup 10, or the upper end of the cup might be threaded, as shown in Fig. 3, to be engaged by an internal thread formed upon the flange of the cover 12.

Figure 4:
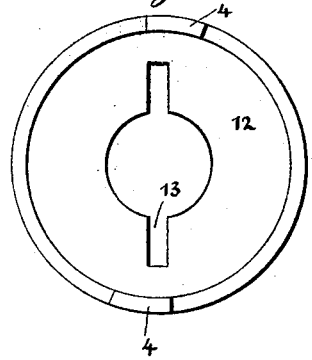

Within the cup 10 I arrange a piston or follower, 15, which is provided with a threaded stem, 16, which said stem engages with a winged nut, 14, that is formed with a flange, 3, which fits against the under face of the cover 12, the aperture 13 of said cover being of proper form to permit the cover to be passed over the nut 14, the shape of this aperture being best shown in Fig. 4.

In operation the cup 10, after being connected to the bearing, is partially filled with the lubricating material. The piston 15 is then inserted within the cup and the cover 12 is placed in position. Then by turning the nut 14 the piston will be forced downward and the lubricating material beneath the piston will be forced out through the projection 11 to the bearing in connection with which the lubricator is arranged, the outer flow of the lubricating material being assisted by the suction produced by the rotation of the shaft within the bearing.

Having thus fully described my invention, I claim as new and desire to secure by Letters Patent—

1. The combination, with the cup, the piston and its threaded stem, and the separate and independent nut having an outwardly-projecting flange around its lower end, of the cover having a central aperture through which the nut may be passed till its flange contacts with the lower face of the cover, substantially as set forth.

2. As an improved article of manufacture, a lubricator consisting in the cup 10, provided with the threaded centrally-apertured projection 11, the cover 12, having a central aperture, 13, and opposite recesses communicating therewith, the threaded stem 16, the piston 15, the winged nut 14, passed up through the aperture and recesses in the top and formed on its lower end with a flange of greater diameter than the central aperture, 13, and means for connecting the cover and cup, whereby the cup, cover, nut, and stem may all be separated one from the other, substantially as set forth.

GEORGE RUPLEY.

Witnesses:
M. J. MULLIN,
J. H. WOOD.